United States Patent [19]

Gillingham et al.

[11] Patent Number: 4,504,293

[45] Date of Patent: Mar. 12, 1985

[54] SELF-CLEANING AIR FILTER

[75] Inventors: Gary R. Gillingham, Prior Lake; Fred H. Wahlquist, Richfield; Bernard A. Matthys, Apple Valley, all of Minn.

[73] Assignee: Donaldson Company, Inc., Minneapolis, Minn.

[21] Appl. No.: 508,562

[22] Filed: Jun. 28, 1983

Related U.S. Application Data

[60] Continuation-in-part of Ser. No. 386,617, Jun. 9, 1982, abandoned, Division of Ser. No. 364,535, Apr. 1, 1982, Pat. No. 4,452,616, Continuation of Ser. No. 204,579, Nov. 6, 1980, abandoned, Continuation-in-part of Ser. No. 20,477, Mar. 14, 1979, abandoned.

[51] Int. Cl.³ ............... B01D 46/02; B01D 46/42; B01D 50/00
[52] U.S. Cl. .................................. 55/350; 55/302; 55/478; 55/481; 55/484; 55/493; 55/502; 55/504
[58] Field of Search ............... 55/302, 350, 478, 481, 55/484, 504, 493, 502

[56] References Cited

U.S. PATENT DOCUMENTS

| | | | |
|---|---|---|---|
| 2,853,153 | 9/1958 | Sexton | 55/481 X |
| 3,064,818 | 11/1962 | Kasten | 55/481 X |
| 3,204,390 | 9/1965 | Heyl | 55/341 HMB |
| 3,376,696 | 4/1968 | Wells et al. | 55/341 HMB X |
| 3,423,908 | 1/1969 | Hart | 55/481 |
| 3,593,503 | 7/1971 | Andrews | 55/481 |
| 4,124,361 | 11/1978 | Revell | 55/502 X |
| 4,198,221 | 4/1980 | Catlin et al. | 55/481 |

Primary Examiner—Kathleen J. Prunner
Attorney, Agent, or Firm—Merchant, Gould, Smith, Edell, Welter & Schmidt

[57] ABSTRACT

An improved self-cleaning air filter (2) of the pulse jet type. The filter includes at least one filter element (20) located in a dirty air plenum (6) which is separated from a clean air plenum (8). A valve (64) directs a cleaning jet of gas that moves in a back flow direction along the filter element to remove accumulated contaminants therefrom. A diffuser is located in the clean air plenum for diffusing the cleaning jet of gas to convert the cleaning jet to a high volume, low pressure jet which substantially fills the entire cross-sectional area of the filter element. The filter element is releasably contained inside the dirty air plenum on elongated support members (36). Rotatable cams (44) are provided for laterally shifting the filter element to lock the filter element in place against a dividing wall (10).

8 Claims, 6 Drawing Figures

SELF-CLEANING AIR FILTER

This application is a continuation in part of application Ser. No. 386,617, filed June 9, 1982, abandoned, which was a division of application Ser. No. 364,535, filed Apr. 1, 1982, and now U.S. Pat. No. 4,452,616, which was a continuation of application Ser. No. 204,579, filed Nov. 6, 1980, now abandoned, which was a continuation in part of application Ser. No. 020,477, filed Mar. 14, 1979, and now abandoned.

TECHNICAL FIELD

This invention relates generally to a self-cleaning air filter of the pulse jet type. As such this invention is useful in any engineering application which requires the filtering of particulate contaminants, e.g. dust, sand particles, etc. Such applications might include atmospheric filtering for air pollution control and traditional air filtering operations for internal combustion engines and the like. More particularly, the air filter which will be specifically disclosed in this application has been designed for use with the power plants of railroad locomotives.

DESCRIPTION OF THE PRIOR ART

Air filters are widely used for many purposes. For example, they have long been used for filtering the intake air used in the combustion cycle of an internal combustion engine. In addition, various other types of equipment often require some type of air filter. Moreover, air filters are often used in industrial applications, e.g. flour mills, for filtering the atmospheric air which is breathed by the plant workers. These latter applications have become more widespread with the advent of various laws regulating environmental conditions in industrial plants.

Eventually, any filter medium which is used becomes clogged or "caked" with the various particulate contaminants which have been filtered. This clogged condition is often referred to as one in which the filter element is "loaded". If there were no effective way of cleaning the filter medium after it is loaded, the medium would have to be discarded after a single use. This is economically wasteful. It is preferable to periodically clean and then reuse the filter medium.

Various types of self-cleaning air filters have long been known. These filters can remove accumulated contaminants from the filter medium which greatly extends the useful life of the medium. One method often used in the gas filtering industry to remove contaminants from a filter is to periodically reverse the direction of fluid flow through the medium. The contaminant then releases from the medium as large agglomerates which settle into a collecting chamber where they can be removed.

One type of apparatus which is commonly used in a reverse flow self-cleaning air filter is one which may be referred to as a pulse jet type of air filter. In this filter, a pulse of compressed gas is released from a storage reservoir by a valve. The valve forms a jet of gas which is directed towards the filter medium. This jet of gas first usually enters a venturi which is located immediately above the filter element. The low pressure at the venturi throat effectively causes the ambient air surrounding the filter element to be drawn in with the pulse jet and directed downwardly into the filter in a "back flow" type of operation. Thus, the venturi effectively converts a small volume of high pressure air into a large volume of low pressure air which travels down the filter medium.

However, the venturi type of apparatus noted above has a number of distinct disadvantages. It is useful primarily in what might be called low performance environments. Such environments are characterized by (1) a relatively large amount of space in which to mount the filter, and (2) a relatively low primary air flow velocity through a filter. For example, in a typical low performance application in an industrial environment (e.g. a flour mill), lots of room is usually available for the filter to be installed. Thus, size is not a critical parameter for the filter. In addition, the average air flow velocity through the filter medium is usually from 1.0-3.0 feet per minute (f.p.m.). However, a venturi is not usually suitable in a high performance application. Space is an important consideration in such applications and the average air flow velocity through the filter medium is on the order of 10 f.p.m. or more. A filter for the engine or power plant of a railroad locomotive can be classified as a high performance application.

In high performance applications as identified above, a venturi type of pulse jet cleaning system isn't suitable for a number of reasons. First, the venturi is usually positioned inside the clean air plenum and is usually quite long and bulky. Thus, the venturi design requires a certain minimum amount of space for installation. This does not allow for a compact air cleaner design as is required in these applications. Secondly, at the higher average air flow velocities which are encountered in a typical high performance application, the pressure drop occurring across the conventional venturi becomes much greater. In fact, the pressure drop is often so large that the engine to which the filter is attached has to expend a considerably amount of energy in causing air to flow through the filter. This increases the fuel consumption of the engine which is obviously undesirable.

Consequently, there is a need for some type of system for use in a pulse jet self-cleaning air filter which would serve to diffuse the high pressure jet of air across the filter element, but which does not have the disadvantages of a venturi. Several prior art patents have suggested various types of diffusers. For example, U.S. Pat. No. 3,509,698 to Medcalf et al. discloses a cone which is mounted below the pulse jet nozzle for spreading the air out into the filter element in a propagating wave form. However, the cone in the Medcalf arrangement is mounted inside a tubular extension or nozzle mounted on the top of the filter element. As such Medcalf does not have many advantages over a typical venturi. The tubular extensions add substantially to the height of the filter element. In addition, the cones restrict normal air flow through the filter during all air filtering operations since they are mounted inside the tubular extensions. This is true of other patents, such as U.S. Pat. No. 3,594,992 to Carr, which disclose similar types of diffuser members. All of these diffusers are located in such a manner as to restrict the normal air flow through the filters.

Furthermore, most of the self-cleaning pulse jet types of air filters include a plurality of fitler elements which are located in the dirty air plenum and have one end connected around an outlet opening in a dividing wall which forms both the dirty and clean air plenums. Some of the means used to support the filter elements may be quite complicated. Thus, the filter elements may take a great deal of time to install or replace inside the filter housing. There is a need for simple supporting means for the filter elements inside the filter housing which can be used to quickly and easily replace the filter elements. In addition, in any high performance filter application, the supporting means for the filter elements must be compact.

SUMMARY OF THE INVENTION

One aspect of this invention relates to a pulse jet self-cleaning air filter having means for diffusing the jet of gas to substantially fill the cross-sectional area of the filter element at the element outlet opening. The diffusing means is located in the clean air plenum so as not to restrict the normal air flow through the filter during air filter operations.

In addition, another aspect of this invention is an air filter having means for quickly and easily aligning and securing one or more filter elements inside the filter housing.

The air filter of this invention comprises a housing which includes a dirty air plenum and a clean air plenum defined by a partition having at least one outlet opening therein. A filter element is installed inside the dirty air plenum with one end of the filter element being sealed around the outlet opening. Means for generating a cleaning jet of gas and for directing that jet into the filter element is provided. A diffuser is mounted in the clean air plenum and is spaced above, i.e. away from, the separating partition. The diffuser serves to spread the jet of compressed gas to substantially fill the cross-sectional area of the filter element, but because of its location does not restrict the normal air flow through the filter element nor does it engender an appreciable pressure drop across the filter element.

The air filter of this invention relates to an improved means for supporting the filter elements inside the dirty air plenum of the housing. This supporting means comprises a pair of spaced, elongated rails on which the ends of each filter element roll. Each rail has a shallow concave seating area which receives the filter element therein. The filter element can be laterally slid in each of the seating areas such that the filter element can be sealed around one of the outlet openings in the separating partition.

BRIEF DESCRIPTION OF THE DRAWINGS

The present invention will be described hereafter in the Detailed Description, when taken in conjunction with the following drawings, in which like reference numerals refer to like elements throughout.

DETAILED DESCRIPTION

Figure 1:
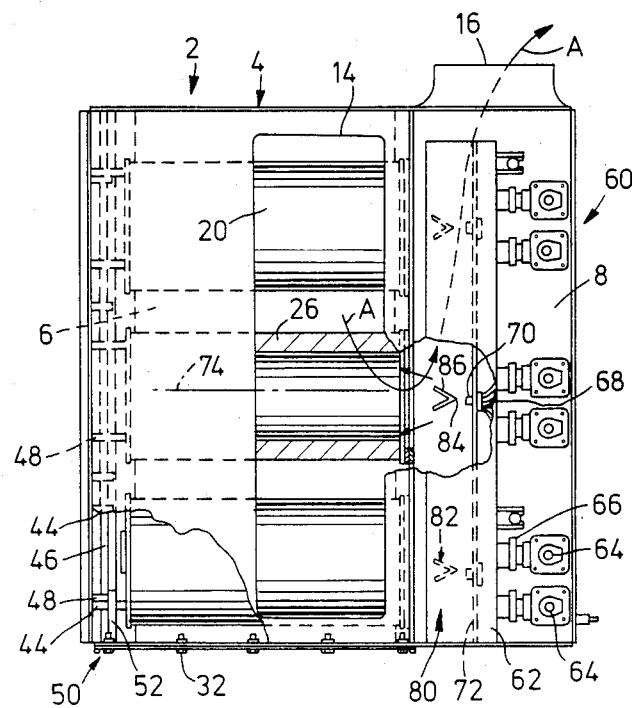
FIG. 1 is a top plan view of an improved self-cleaning air filter according to this invention, with portions of FIG. 1 being broken away to illustrate various of the components of the air filter including the cleaning jet and its associated diffuser means.

This invention comprises an improved self-cleaning air filter of the pulse jet type having a number of novel features. An air filter according to this invention is generally indicated as 2 in the drawings. Air filter 2 as disclosed herein is designed for use in filtering the intake air for the power plant of a railroad locomotive. However, air filter 2 is not limited for use with locomotives. In fact, filter 2 may be used with conventional internal combustion engines or for any other appropriate air filtering purposes such as atmospheric air filtering in various industrial applications. However, air filter 2 is primarily designed for high performance applications, i.e. applications requiring a compact air filter design and having relatively high average velocities of air flow through the filter element, e.g. 10 f.p.m. or more per unit area.

Air filter 2 comprises a filter body or filter housing generally designated as 4. Housing 4 includes a substantially rectangular "dirty air" plenum 6 and an adjoining rectangular "clean air" plenum 8. "Dirty air" and "clean air" are terms of art which refer, respectively, to a gas that is laden with various particulate contaminants and a gas which is not laden with these contaminants and a gas having been filtered. A separating partition or dividing wall 10 in housing 4 fluidically isolates dirty air plenum 6 from clean air plenum 8 except insofar as a plurality of substantially circular outlet openings 12 are concerned. The purpose of the outlet openings 12 contained in wall 10 will be described hereafter.

A substantially rectangular air intake 14 is provided in dirty air plenum 6 to allow contaminant laden or dirty air to pass into the plenum. Similarly, an air outtake 16 is located in clean air plenum 8 for conducting clean filtered air outwardly. Air filter 2 will be suitably connected to the power plant of a locomotive engine (not shown). Air will be sucked through filter 2 during an air filtering operation with the air passing into air intake 14, through the dirty air plenum 6, into the clean air plenum 8, and outwardly through the clean air outtake 16. The direction of this air movement is generally indicated by the arrows A.

Figure 2:
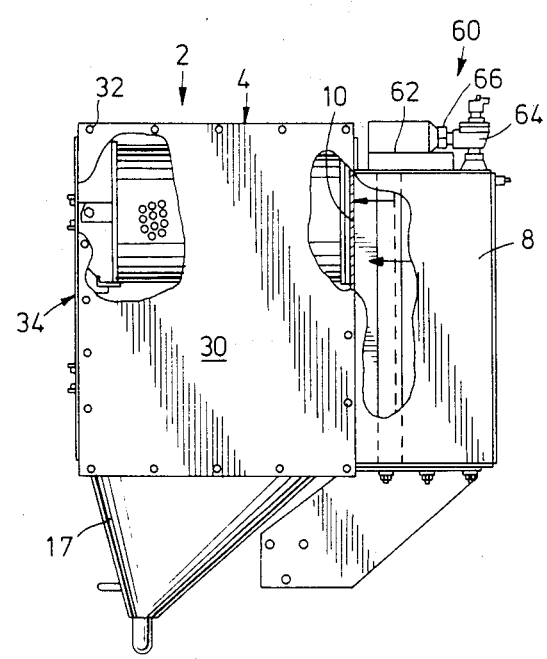
FIG. 2 is a front elevational view of the improved air filter shown in FIG. 1 as that filter is normally installed.
Figure 3:
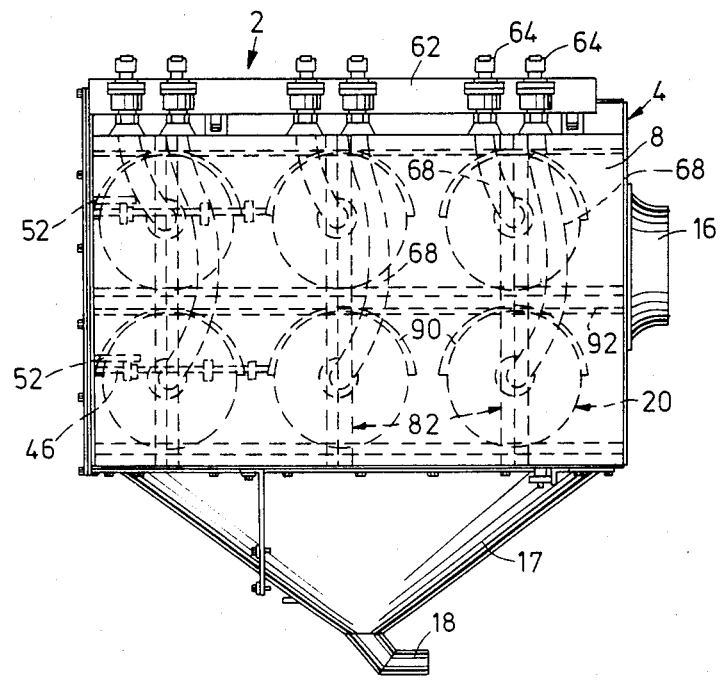
FIG. 3 is a side elevational view of the improved air filter shown in FIG. 1 as that filter is normally installed.

The bottom of dirty air plenum 6 is open and leads to a contaminant collecting hopper generally indicated as 17 in FIGS. 2 and 3. An outlet conduit 18 is connected to the contaminant collecting hopper at the very bottom thereof. Any suitable contaminant removal device (not shown) may be located at the bottom of hopper 17 adjacent conduit 18. Hopper 17 serves to collect contaminants which have been cleaned from a plurality of filter elements contained in dirty air plenum 6. The removal device and the conduit 18 serve to remove the contaminants which have been separated from the filter element. This structure is typical of many conventional pulse jet self-cleaning air filters.

A plurality of filter elements, generally designated as 20, are releasably mounted inside dirty air plenum 6 for filtering the air passing therethrough. Each filter element 20 is generally identical. Referring to FIG. 1, filter element 20 includes a hollow, cylindrically shaped filter medium 26 made from any generally conventional filter materials. For example, filter medium 26 preferably comprises a cylinder made of a longitudinally pleated paper filter medium. Referring to the arrows A, air which is being filtered passes from the exterior of the filter element 20 into the interior hollow bore 27 of the cylindrical filter medium 26. Thus, the contaminants which have been filtered from the air will be retained on the exterior surface of the filter medium 26.

The opposed ends of filter medium 26 are respectively fixedly bonded to cylindrical end plates 22 and 24. In effect, end plates 22 and 24 form rims for the filter element 20 on which filter element 20 can be rolled. The end plate 24 has a circular opening therein which is the same size and is designed to mate with the outlet opening 12 in wall 10. A circular gasket 28 is located on the exterior surface of end plate 24. Gasket 28 is slightly larger than the diameter of outlet openings 12 in an air-tight manner when the filter element 20 is forced against wall 10 as described in more detail hereafter.

Figure 4:
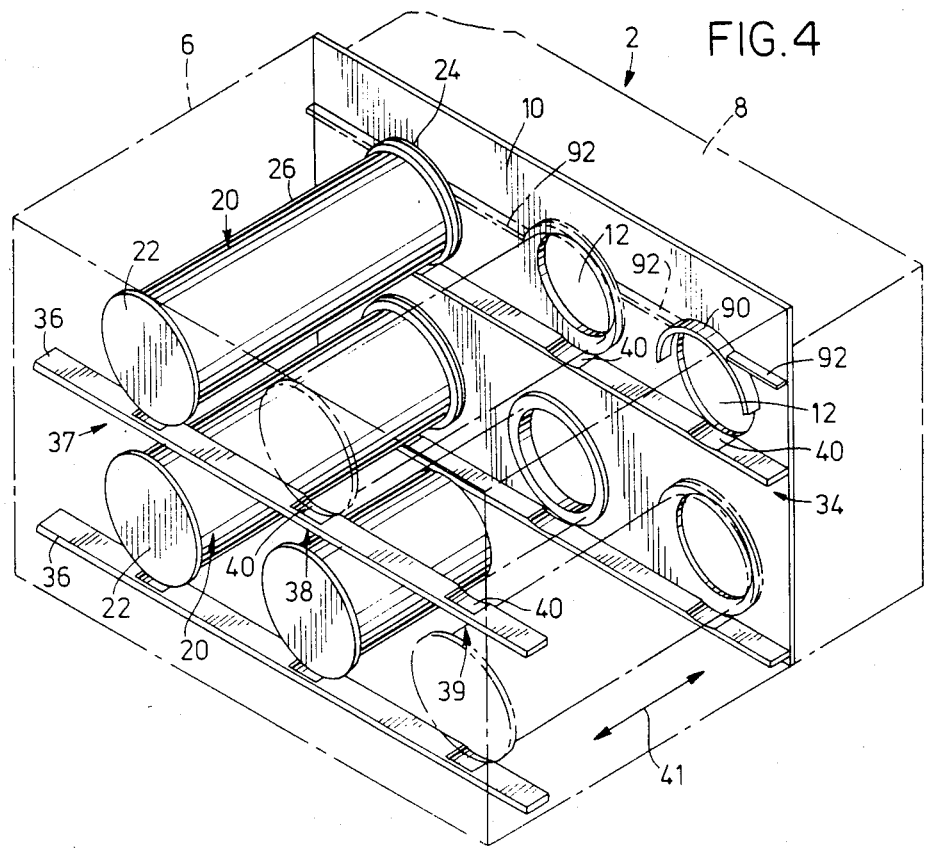
FIG. 4 is a partial perspective view of the improved air filter shown in FIG. 1, particularly illustrating the means for supporting the filter elements inside the dirty air plenum.

One side of the dirty air plenum 6 is closed by a removable access cover 30. Access cover 30 is removably attached to dirty air plenum 6 by a plurality of bolts, screws or the like generally designated as 32. As shown in FIG. 4, there are six outlet openings 12 provided in the wall 10. These outlet openings 12 are arranged in two rows of three openings each. Thus, a rectangular array of six filter elements 20 is designed to be contained inside dirty air plenum 6. Each filter element 20 will seal around one of the outlet openings 12.

An improved means for supporting the filter elements 20 inside dirty air plenum 6 is generally indicated as 34. Supporting means 34 includes two spaced and elongated support members or rails 36. Support members 36 are fixedly mounted respectively on opposed side walls of the dirty air plenum 6. There are two pairs of these support members 36 with one pair being provided for each row of the filter elements 20. Thus, three filter elements 20 are supported on each pair of support members 36.

Support members 36 include means for securely seating each filter element 20 thereon in an aligned relationship with one of the outlet openings 12. This seating means includes three pairs 37, 38 and 39 of concave shaped recesses 40 located in the upper surfaces of support members 36. The recesses 40 in each pair 37–39 are located on the opposed support members 36 and are aligned with one another. Thus, one recess 40 is provided for each end plate 22 and 24 of filter elements 20. The shape of the recesses 40 corresponds to the peripheral shape of the end plates 22 and 24 to allow filter elements 20 to become seated in the recesses. In addition, recesses 40 are laterally elongated in a lateral direction indicated as 41. This allows the filter elements 20 to be laterally movable relative to support members 36.

Figure 5:
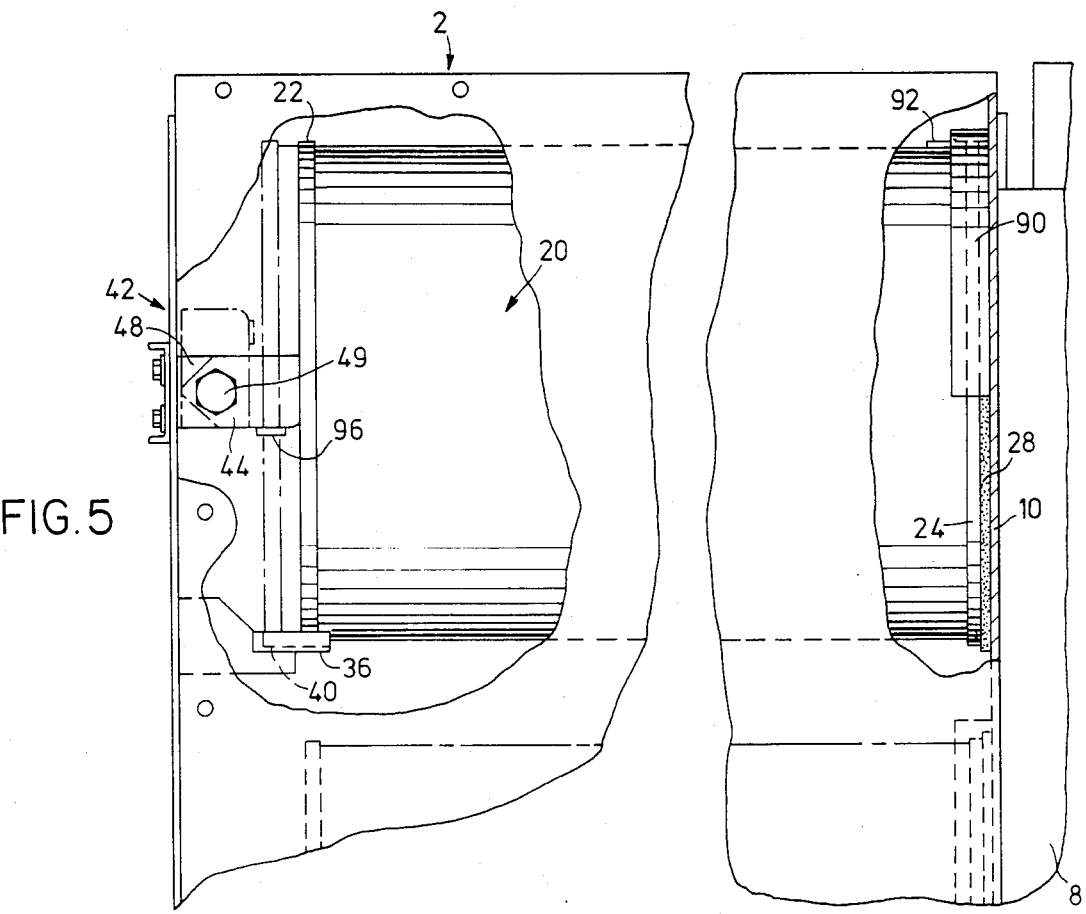
FIG. 5 is a partial side elevational view of the improved air filter shown in FIG. 1, particularly illustrating the means for supporting one of the filter elements including the means for forcing the filter element laterally to seal against the separating partition of the air filter.
Figure 6:
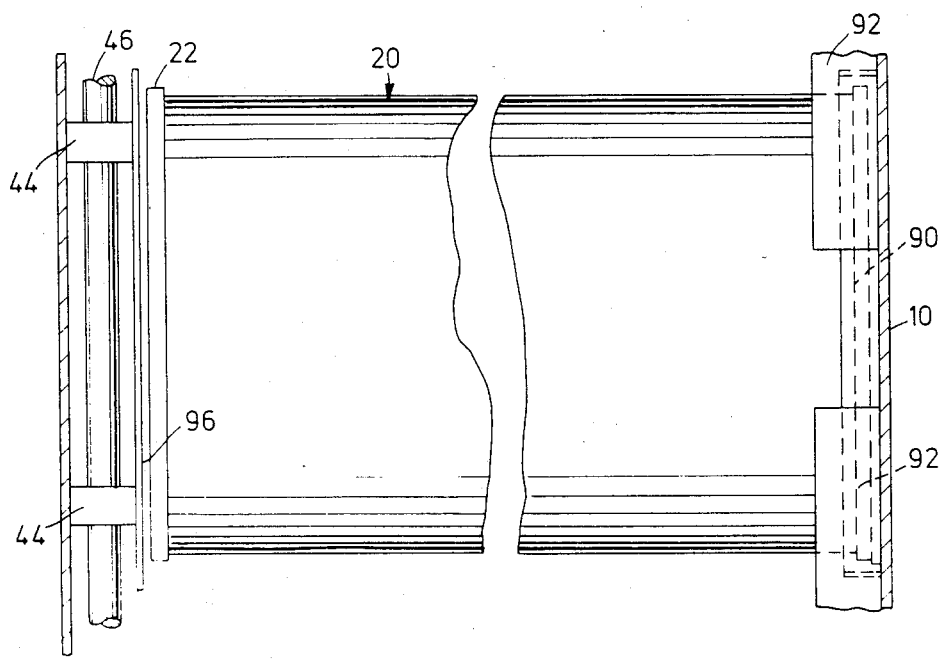
FIG. 6 is a partial top plan view of the improved air filter shown in FIG. 1, particularly illustrating one of the filter elements therein.

In addition, supporting means 34 includes a selectively actuable means, generally indicated as 42 in FIG. 5, for laterally sliding or forcing each filter element in the lateral direction 41 towards dividing wall 10. This forcing means 42 comprises a plurality of rotatable cams 44 which are designed to engage against the end plates 22 of each filter element 20. Two cams 44 are provided for each filter element 20. Cams 44 are fixedly mounted on an elongated shaft 46 which passes through the dirty air plenum 6. Shaft 46 is rotatably journalled inside the dirty air plenum 6 by means of suitable bearing blocks 48. Two such shafts 46 are mounted in plenum 6 for use with each row of the filter elements 20 on the vertically spaced pairs of support members 36. See FIG. 3. The end of shaft 46 carries a conventionally shaped bolt head 50 located inside plenum 6. Shaft 46 can be manually rotated by applying a wrench to bolt head 50 and rotating the wrench. Rotation of shaft 46 will rotate the cams 44 from an inoperative position, shown in phantom in FIG. 5, to a operative position, shown in solid lines, at which cams 44 engage filter elements 20.

To install filter elements 20 in dirty air plenum 6, access cover 30 is first removed. Each filter element 20 is then placed onto the support members 36 with each end plate 22 and 24 being respectively received on the top surface of one of the support members 36. Filter elements 20 are then simply rolled along support members 36 by virtue of the rolling engagement between the circular end plates 22 and 24 and the top surface of the support members 36. Whenever the filter element 20 comes to one pair 37, 38 or 39 of the recesses 40, filter element 20 becomes seated in the recesses 40 and stops rolling. However, the filter element 20 can be manually pushed out of the recesses 40 to continue rolling down the support members 36 until all three pairs 37–39 of the recesses 40 are filled with filter elements 20. Thus, six filter elements 20 are installed on the two pairs of support members 36 by simply rolling the filter elements 20 down the support members until they become properly seated in the appropriate pair of the recesses 40. During this placement of filter elements 20, cams 44 are rotated into their inoperative position. In this position the cams 44 clear the end plates 22 allowing the filter elements 20 to be installed on support members 36.

After all six filter elements 20 are installed on the support members 36 and are received in one pair of the recesses 40, the shaft 46 is manually rotated by applying a wrench to bolt head 49. This causes cams 44 to be moved from their inoperative position to their operative solid line position in FIG. 5. In the operative position of the cams 44, they engage the end plates 22 and slide the entire filter element 20 in the lateral direction 41. Because the recesses 40 are laterally elongated, the necessary lateral movement of filter element 20 is allowed. This lateral movement will force end plate 24 toward dividing wall 10. This compresses gasket 28 around one of the openings 12 and effects an air-tight seal of the end of filter element 20 relative to wall 10. Cams 44 securely lock the filter elements 20 in place against wall 10. Thus, when both of the shafts 46 have been rotated as noted above, all of the filter elements 20 will be sealed against one of the outlet openings 12. Access cover 30 may then be reinstalled on the dirty air plenum 6. Air filter 2 is then ready for an air filtering operation.

An interlock means 50 is provided on access cover 30 for preventing the cover 30 from being installed if filter elements 20 have not been locked into position against the dividing wall 10. Interlock means 50 simply comprises two horizontally extending finger or latches respectively identified as 52 in FIGS. 1 and 3. Latches 52 extend inwardly from access cover 30 at a location which generally corresponds to the location of cams 44. One latch 52 is provided for each set of cams 44, i.e. one latch 52 is generally located immediately above each shaft 46.

Latches 52 will clear the cam 44 located closest to cover 30 only when the cams are in their operative solid line position. See FIG. 3. If the cams 44 are sticking up in their inoperative position, meaning that the filter elements 20 have not yet been locked against wall 10, then the latches 52 will abut the cams 44 located adjacent cover 30. This prevents cover 30 from being installed on the dirty air plenum 6. Only when all the cams 44 have been rotated downwardly will the latches 52 clear the cams and allow cover 30 to be installed. Thus, interlock means 50 is an important safety feature. It prevents the operator from installing the access cover 30 and conducting an air filtering operation when he has inadvertently failed to lock all the filter elements 20 in place.

Supporting means 34 as described herein is particularly simple and efficient. In order to install the filter elements 20, it is only necessary to roll the filter elements 20 down the support memebers 36 until they are seated in their respective recesses 40. Then, simply by rotating the shafts 46 and hence cams 44, filter elements are transversely slid until they firmly engage against dividing wall 10. In addition, the latches 52 insure that an air filtering operation will not take place unless all of the filter elements 20 are properly locked in place by rotation of cams 44. Thus, the supporting means 34 described herein can be used to quickly and easily install filter elements 20 in dirty air plenum 6. Since filter elements 20 will have to be replaced from time to time, the ease with which the supporting means 34 allows such replacement is obviously desirable.

Another aspect of this invention relates to a pulse jet cleaning means for the air filters 20 which is generally indicated as 60 in FIGS. 1-3. Cleaning means 60 includes a source of compressed gas under a suitably high pressure. This source of gas is preferably a compressed air manifold 62 located on the exterior of clean air plenum 8. A plurality of valves 64 have their inlets connected by conduits 66 to the compressed air manifold 62. The outlets of valves 64 are connected by elongated conduits 68 to nozzles 70. See FIG. 3. One valve 64 and one nozzle 70 is provided for each of the filter elements 20.

Each nozzle 70 is located inside clean air plenum 8 on any suitable support rod 72 or the like. As shown in FIG. 3, each nozzle 70 points along a longitudinal axis 74 through the center of each cylindrical filter element 20. Nozzles 70 are suitable for directing cleaning jets of compressed gas along the axes 74. These cleaning jets are normally high pressure air since the compressed gas in manifold 62 comprises a high pressure air. Control means (not shown) are provided for periodically operating the valves 64 to periodically pulse jets of compressed air through the filter elements in a reverse back flow direction. This direction is indicated by the arrow B in FIGS. 1 and 2. This is a typical structure and method of operation for a pulse jet self-cleaning air filter.

This invention relates generally to the use of a diffuser means indicated as 80. Diffuser means 80 comprises a V-shaped deflector plate 82 located between each nozzle 70 and the corresponding outlet opening 12. Deflector plate 82 has an apex 84 and two outwardly angled sides 86. Deflector plates 82 are located inside the clean air plenum 8 a substantial distance from the outlet openings 12 and wall 10.

Preferably, deflector plates 82 comprise sheet metal fabrications which extend from the top of clean air plenum 8 to the bottom. A single elongated angle forms the deflector plates 82 for two nozzles 70 since the nozzles 70 are generally in line corresponding to the in line orientation of the various filter elements 20 in the two vertically spaced rows. See FIG. 3. Deflector plates 82 diffuse or spread out the cleaning jet of gas to substantially fill the cross-sectional area of the outlet opening 12 and hence filter elements 20. In other words, deflector plates 84 convert the relatively low volums, high pressure cleaning jet issuing from the nozzles 70 to a low pressure, high volume cleaning jet. In addition, deflector plates 82 direct the cleaning jet substantially down the entire cross-sectional area of the filter elements 20 to form a more effective cleaning jet, i.e. the jet is directed directly against filter medium 26. In addition, a quantity of the low pressure surrounding gas in plenum 8 will still be entrained with the cleaning jet as is typical in the case of a venturi type of pulse jet cleaning system.

The particular diffuser means 80 noted herein is advantageous because it replaces the venturi which is conventionally used in a pulse jet type of self-cleaning air filter. This greatly decreases the size needed for clean air plenum 8 and allows a compact air filter design. Such compactness is important in high performance air filter applications. In addition, there is no longer any appreciable pressure drop encountered by the normal air flow during an air filtering operation since a venturi is no longer used. Furthermore, deflector plates 82 are located sufficiently far away from the wall 10 such that they do not provide any substantial obstruction to the normal air flow through filter 2 during an air filtering operation. Thus, the deflector plate 82 provides all of the advantages of a conventional venturi, i.e. it diffuses or spreads out the cleaning jet to substantially fill the filter element 20, but it does not have any of the disadvantages of the venturi or the other deflectors commonly known in the prior art.

Thus, the important design criterions for the deflector plates 82 include the fact that it is located in the clean air plenum 8 sufficiently far above the outlet openings 12 to not pose any appreciable obstruction to the flow of air therethrough. In addition, the design of the deflector plate and its distance from the nozzles 70 has to be selected to insure that the cleaning jets substantially fill the cross-sectional area of the outlet openings 12 at the location of the separating wall 10. Tests have indicated that pulse quality degrades as the distance between the nozzle 70 and the deflector plates 82 decreases and as the diameter of the outlet opening 12 increases. These results indicate that the quality of the cleaning jet is therefor dependent on the percentage of the outlet opening 12 which is "filled" by the cleaning jet. Unless substantially all of the outlet opening 12 is filled by the cleaning jet, at least some of the air which is otherwise present inside filter element 20 will not be carried along in the backflow through the medium. This air will thus leak out of the outlet opening 12 in the direction A even when the cleaning jet is in operation. This is a disadvantageous result.

Another important advantage of the present invention should be emphasized. It has been found that the present invention cleans the filter element 20 better than a venturi type system even though the pressure pulses used in the cleaning jet were comparable. Apparently, because of the shape of the venturi, i.e. the curved walls of the venturi, the cleaning jet which is formed by the venturi is less effective near the open end of the filter element and more effective at the closed end thereof. By open end of the filter element it is meant that end which is adjacent outlet opening 12. Unfortunately, the filter elements 20 tend to load or cake with dust more heavily near the open end rather than the closed end. The cleaning jet formed by the deflector plate 82 tends to clean the open end of the filter element much more effectively than the venturi since the cleaning jet is better directed and more fully expanded at the open end of the element when the deflector plates 82 are used. This will result in superior life for the filter element 20 even when the internal element pressures are comparable. Superior cleaning of the filter elements by the present invention near the open end of the filter element has been verified by observing deposits on the filter element at the conclusion of life tests.

Another feature of the present invention is that the filter elements 20 are horizontally arranged inside the dirty air plenum 6 and that the air intake 14 is located in the top wall of plenum 6. In addition, the hopper 17 which collects the contaminants released from the filter element is located generally beneath the elements. Thus, the normal air inflow through air intake 14 will be in a generally vertical downward direction before the flow enters into the elements 20 and is carried through the outlet openings 12. Consequently, whenever the cleaning jets have been used to release dust or other contaminants from the filter elements 20, the normal air flow through the air filter 2 tends to carry those contaminants downward into the hopper 17. Thus, the arrangement of the components mentioned above serves to ensure that all the contaminants released from the filter element 20 will be collected in the hopper 17 where they may be later removed.

Referring now to FIGS. 3-6, another feature of the invention will be described. It has been found that dust will eventually cause the filter elements 20 to become so contaminated that they must be replaced. During such replacement, the cams 44 are rotated to an inoperative position, the filter elements 20 are moved laterally to their dotted line positions in FIG. 5, and are then rolled outwardly from plenum 6. During this removal process, it has been found that dust which is caked near the open end of the filter element 20, i.e. around the end plate 24 and gasket 28, will tend to be released from that end of the filter element and fall through the outlet opening 12 into the clean air plenum 8. This dust will then be carried into the engine with which the air filter 2 is used when the air filter is next put into operation. This is an obviously undesirable result as it defeats the very purpose of air filter 2.

To prevent the above-identified problem from occurring, the present invention utilizes a plurality of semicircular baffles, each of which is generally indicated as 90, around each of the outlet openings 12. Referring to FIG. 4, only one such baffle 90 is shown in solid lines around one opening 12 although it should be understood that six such baffles for each of the six openings 12 are provided. See FIG. 3. Baffles 90 are slightly larger in diameter than the diameter of the filter element 20 and closely surround the top half of the open end of filter element 20. These baffles prevent dust from accumulating in large quantities around the open end and prevent that dust from entering into the clean air plenum 8 when the filter elements 20 are replaced. Thus, baffles 90 serve as an effective means for preventing any dust contamination of clean air plenum 8 during filter element replacement.

However, use of the baffles 90, which is desirable, but which is not strictly necessary to the basic principles of this invention, complicate somewhat the task of removing the filter elements 20. This complication arises because the end plates 22 and 24 on each of the filter elements tend to "catch" or hang up on either the cams 44 or the baffles 90 respectively. To prevent this, a plurality of outwardly extending tabs 92 are located between each of the baffles 90 on the separating wall 10. Tabs 92 extend outwardly from wall 10 a greater distance than the baffles 90 and thus effectively prevent the end plates 24 from catching on the baffles 90. In addition, an elongated guide member or rail 96 is mounted on that face of the cams 44 which is vertical when the cams are in their inoperative position as shown in dotted lines in FIG. 3. Rail 96 spans and is attached to all of the cams 44 on any given shaft. The rail 96 serves to engage the end plate 22 and guide that end plate in a direction away from the cams 44 to straighten the filter element 20 whenever the filter element has a tendency to become cocked relative to support members 26. Obviously, the distance between the end of the tabs 92 and rail 96 during removal of the filter element 20 must be slightly greater than the length of the filter element.

In addition, use of the outwardly protruding tabs 92 is also advantageous for another reason. For example, if one of the filter elements 20 is not properly seated in one of the opposed pairs 37-39 of recesses 40, it might be possible nonetheless to rotate the cams 44 to their operative position by laterally pushing the filter elements 20 towards the dividing wall 10. Thus, operation of the filter 2 could conceivably take place even when one or more of the filter elements 20 was not properly seated and sealed around the outlet opening 12. However, by using the outwardly protruding tabs 92, any substantial lateral movement of the filter element 20 is stopped by virtue of the engagement of the end plate 24 with one of the tabs 92. Thus, unless each of the filter elements 20 is properly seated in the recesses 40, it becomes impossible to actuate the cams 44 to their solid line operative position. Such an indication would mean that one of the elements 20 was misaligned inside plenum 6 and would be a valuable safety feature for operating the filter 2.

Various modifications of this invention will be apparent to those skilled in the art. For example, the diffuser means 80 may comprise a cone or other type of form which will cause effective diffusion of the jet, i.e. a pyramidal shape. Furthermore, it is not necessary that the filter element 20 include a pleated filter medium 26. The diffuser means 80 taught herein may be used with other types of filter elements including elongated bag type filters. Furthermore, the support members 36 are preferably perforated rather than being solid over the length thereof. This prevents dust from becoming built up on the support members 36 which would otherwise hamper removal of used filter elements 20 from the air filter 2. Thus, the scope of this invention is to be limited only by the appended claims.

We claim:

1. An improved air filter of the type in which at least one filter element is contained inside a housing and has opposed ends with one end thereof adapted to be sealed around an outlet opening provided in one wall of the housing, wherein the improvement relates to a means for supporting the filter element in the housing, which comprises:

two spaced and elongated support members contained in the housing and arranged to support respectively the opposed ends of the filter element, the filter element being laterally movable on the support members in a lateral direction relative to the support members towards and away from the outlet opening;

means carried on the housing for forcing the filter element supported on the support members in the lateral direction until the one end of the filter element engages the one wall of the housing and seals around the outlet opening;

wherein each of the support members includes means for seating the filter element in a position which is generally aligned with the outlet opening in the one wall of the housing; and wherein the filter element is cylindrical and is adapted to roll along the support members and in which the seating means comprises arcuately shaped recesses located in each of the support members which recesses correspond to the shape of the periphery of the filter element, and wherein said recesses are laterally elongated to allow for the lateral movement of the filter element.

2. An improved air filter as recited in claim 1, in which the lateral forcing means comprises a cam pivotably mounted in the housing adjacent the end of the filter element which is opposite to the one end which is adapted to be around the outlet opening, wherein the cam is rotatable from an inoperative position at which the cam is disengaged from the filter element to an operative position at which the cam engages and laterally forces the filter element in the lateral direction.

3. An improved air filter as recited in claim 1, further including means carried on the housing adjacent the one end of the filter element for preventing particulate contaminants from caking on the one end of the filter element, whereby the contaminants will not pass through the outlet opening when the filter element is replaced.

4. An improved air filter as recited in claim 3, in which the filter element is horizontally disposed inside the housing and the preventing means comprises a semicircular baffle surrounding the top half of the filter element adjacent the one end thereof.

5. An improved air filter of the type in which at least one filter element is contained inside a housing and has opposed ends with one end thereof adapted to be sealed around an outlet opening provided in one wall of the housing, wherein the improvement relates to a means for supporting the filter element in the housing, which comprises:

two spaced and elongated support members contained in the housing and arranged to support respectively the opposed ends of the filter element, the filter element being laterally movable on the support members in a lateral direction relative to the support members towards and away from the outlet opening;

means carried on the housing for forcing the filter element supported on the support members in the lateral direction until the one end of the filter element engages the one wall of the housing and seals around the outlet opening; and wherein the lateral forcing means comprises a cam pivotably mounted in the housing adjacent the end of the filter element which is opposite to the one end which is adapted to be around the outlet opening, wherein the cam is rotatable from an inoperative position at which the cam is disengaged from the filter element to an operative position at which the cam engages and laterally forces the filter element in the lateral direction.

6. An improved air filter as recited in claim 5, further including a removable access cover on the housing which may be removed to allow the filter element to be placed on the support members, and further including interlock means for preventing the access cover from being installed on the housing when the cam is in its inoperative position.

7. An improved air filter as recited in claim 5, in which a plurality of filter elements are carried on the support members and a like plurality of outlet openings are provided in the one wall of the housing, and wherein a like plurality of rotatable cams are provided in the housing which respectively bear against one of the filter elements for laterally forcing each of the filter elements against its respective outlet opening.

8. An improved air filter of the type in which at least one filter element is contained inside a housing and has opposed ends with one end thereof adapted to be sealed around an outlet opening provided in one wall of the housing, wherein the improvement relates to a means for supporting the filter element in the housing, which comprises:

two spaced and elongated support members contained in the housing and arranged to support respectively the opposed ends of the filter element, the filter element being laterally movable on the support members in a lateral direction relative to the support members towards and away from the outlet opening;

means carried on the housing for forcing the filter element supported on the support members in the lateral direction until the one end of the filter element engages the one wall of the housing and seals around the outlet opening;

wherein each of the support members includes means for seating the filter element in a position which is generally aligned with the outlet opening in the one wall of the housing; and further including means for preventing the filter elements from being forced laterally by the lateral forcing means unless the filter element is located in the seating means.

* * * * *